United States Patent
Dean

(10) Patent No.: US 6,593,428 B2
(45) Date of Patent: Jul. 15, 2003

(54) SYNDIOTACTIC POLYSTYRENE ALLOY COMPOSITIONS

(75) Inventor: David M. Dean, West Chester, PA (US)

(73) Assignee: E. I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/955,233

(22) Filed: Sep. 18, 2001

(65) Prior Publication Data

US 2002/0061965 A1 May 23, 2002

Related U.S. Application Data

(60) Provisional application No. 60/233,749, filed on Sep. 19, 2000.

(51) Int. Cl.$^7$ .......................... C08L 41/00; C08L 35/02; C08L 33/04; B32B 27/00
(52) U.S. Cl. ........................ 525/206; 525/222; 525/240; 525/241; 524/442; 428/500; 428/98; 428/461; 428/463
(58) Field of Search ................................. 525/206, 222, 525/240, 241; 524/442; 428/500, 98, 461, 463

(56) References Cited

U.S. PATENT DOCUMENTS

| | | | |
|---|---|---|---|
| 5,270,353 A | * 12/1993 | Nakano et al. | 428/375 |
| 5,543,462 A | 8/1996 | Okada et al. | |
| 5,902,850 A | * 5/1999 | Chino et al. | 524/494 |

FOREIGN PATENT DOCUMENTS

JP      6345923 A      3/1995

* cited by examiner

*Primary Examiner*—Nathan M. Nutter
*Assistant Examiner*—Thao Tran

(57) ABSTRACT

The invention provides thermoplastic polymer alloy compositions based on syndiotactic polystyrene, ethylene copolymers and styrene block copolymers. They are useful in high temperature, chemical resistant molding applications. The compositions are formed by melt-blending under high shear. Preferably the composition contains syndiotactic polystyrene, an epoxy group-containing ethylene copolymer, an acid group-containing styrene copolymer, and optionally a styrene-containing block copolymer.

17 Claims, No Drawings

SYNDIOTACTIC POLYSTYRENE ALLOY COMPOSITIONS

CROSS-REFERENCE TO RELATED APPLICATIONS

Applicant claims the benefit of priority to provisional application 60/233,749 filed Sep. 19, 2000, herein incorporated by reference.

BACKGROUND OF THE INVENTION

1. Field of the Invention

This invention relates to thermoplastic alloy compositions comprising syndiotactic polystyrene (SPS). This invention specifically relates to thermoplastic alloy compositions comprising SPS, an epoxy group-containing ethylene copolymer, an acid group-containing styrene copolymer, and optionally a styrene-containing block copolymer.

2. Description of the Related Art

Previous patents have taught that using a styrene-containing block or graft copolymer can help compatibilize a rubber phase with SPS. For example, U.S. Pat. No. 5,902,850 discusses the use of styrene block or graft copolymers with a styrene content less than 85% to compatibilize a polyolefin modifier with syndiotactic polystyrene. The polyolefins claimed in U.S. Pat. No. 5,902,850 are primarily homopolymers or copolymers based on ethylene or propylene monomers.

In addition, U.S. Pat. No. 5,543,462 has taught that using a rubbery material with polar groups such as maleic anhydride or epoxy can act as an effective modifier for SPS. Although U.S. Pat. No. 5,543,462 discloses modifiers which contain reactive groups, the modifiers described are all rubbery elastomers.

Although the prior art describing SPS modification provides compositions with an increase in ductility and extensibility, there exists a need in the art for compositions with more efficient and effective modifiers, providing for improved alloy compositions that contain a minimum amount of modifier.

BRIEF SUMMARY OF THE INVENTION

The invention provides a polymer composition comprising a melt blend of (a) about 10 to 95 wt. % syndiotactic polystyrene polymer;

(b) about 5 to 60 wt. % rubbery ethylene copolymer comprising a first reactive group; and (c) about 1 to 40 wt. % styrene copolymer comprising a second reactive group, wherein the first reactive group and the second reactive group are reactive with each other and the total of the weight % of components (a), (b) and (c) is 100%.

The invention further provides a polymer composition comprising a melt blend of (a) about 50 to 85 wt. % syndiotactic polystyrene polymer;

(b) about 15 to 30 wt. % rubbery ethylene copolymer comprising a first reactive group; and (c) about 3 to 20 wt. % styrene copolymer comprising a second reactive group, wherein the first reactive group and the second reactive group are reactive with each other and the total of the weight % of components (a), (b) and (c) is 100%.

DETAILED DESCRIPTION OF THE INVENTION

The invention herein provides a polymer composition comprising a melt blend of a syndiotactic polystyrene (SPS), a rubbery ethylene-based copolymer containing a first reactive group, and a non-rubbery styrene-based copolymer containing at least one second reactive group, wherein the first and second reactive groups are capable of reacting with each other. The composition exhibits a partially cross-linked rubbery phase having improved compatibility with the SPS.

Surprisingly, this combination of a reactive styrene copolymer and an ethylene copolymer containing reactive groups produces improvements even when the reactive styrene copolymer is a simple random styrene-based copolymer with styrene content greater than 85 wt. %, contrary to the teaching of U.S. Pat. No. 5,902,850 which requires styrene block or graft copolymers. This novel composition demonstrates improved physical properties, such as improved elongation at break and/or improved toughness. The composition is useful for a variety of applications, such as molded articles, films, sheets, wire and cable coatings, and extruded tube or hose.

The invention specifically provides a polymer composition comprising a melt blend of (a) about 10 to 95 wt. % syndiotactic polystyrene polymer (SPS); (b) about 5 to 60 wt. % rubbery ethylene copolymer comprising a first reactive group; and (c) about 1 to 40 wt. % styrene copolymer comprising a second reactive group. Components (a), (b) and (c) total to 100 wt. %. The first reactive group and second reactive group are reactive with each other, thus allowing the compatibilization to take place.

Syndiotactic polystyrene (SPS) is a polystyrene having a syndiotactic configuration. The stereochemical structure of the polymer is syndiotactic meaning that the phenyl groups or substituted phenyl groups which are in the side chains of the polymer are located alternately on opposite sides relative to the main chain of the polymer that consists of carbon-carbon bonds. The SPS resin of component (a) preferably has a high melting point (270° C. melting peak) and is a substantially linear polymer having a relatively high molecular weight. Such resins are available commercially such as Questra®, sold by Dow Chemical. Component (a) may also comprise SPS that contains comonomers, such as p-methylstyrene or divinylbenzene. The alloy composition described by this invention preferably contains about 10% to about 95% by weight (a), most preferably about 50% to 85% by weight. Compositions with (a) greater than 95 wt % are generally too brittle and lack a high degree of extensibility.

Rubbery ethylene copolymers (b) useful in the compositions of the invention are ethylene copolymers copolymerized with one or more of a first reactive group. By an elastomeric or "rubbery" polymer is meant a polymer having a flexural modulus (of unfilled pure elastomeric polymer of 35 MPa or less when measure by ASTM D790, and not having a Tg above 30° C., preferably not having a Tg about 0° C. Glass transition temperatures are measured by ASTM D-3418 at a heating rate of 20° C./min and the Tg is taken as the midpoint of the transition. Conversely, a "non-rubbery" or non-elastomeric polymer would have a flexural modulus of greater than 35 MPa and a Tg greater than 30° C. The first reactive group may be unsaturated epoxides of 4–11 carbon atoms (such as glycidyl acrylate, glycidyl methacrylate, allyl glycidyl ether, vinyl glycidyl ether, and glycidyl itaconate), unsaturated isocyanates of 2–11 carbon atoms (such as vinyl isocyanate and isocyanato-ethyl methylacrylate, aziridine, silanes, or oxazoline), and may additionally contain an alkyl acrylate, alkyl methacrylate, carbon monoxide, sulfur dioxide and/or vinyl ether, where the alkyl radical is from 1–12 carbon atoms.

In particular, the rubbery ethylene copolymer is a copolymer of at least 50% by weight ethylene, 0.5–15% by weight of at least one first reactive group selected from the group consisting of (i) an unsaturated epoxide of 4–11 carbon atoms, (ii) an unsaturated isocyanate of 2–11 carbon atoms, (iii) an alkoxy or alkyl silane wherein the alkyl group is from 1–12 carbon atoms, and (iv) an oxazoline, and 0–49% by weight of a moiety selected from at least one of an alkyl acrylate, alkyl methacrylate, vinyl ether, carbon monoxide, and sulfur dioxide, where the alkyl and ether groups above are 1–12 carbon atoms.

Preferred rubbery ethylene copolymers (b) for use in the compositions of the present invention include ethylene/glycidyl acrylate, ethylene/n-butyl acrylate/glycidyl acrylate, ethylene/methylacrylate/glycidyl acrylate, ethylene/glycidyl methacrylate, ethylene/n-butyl acrylate/glycidyl methacrylate and ethylene/methylacrylate/glycidy methacrylate copolymers. The most preferred rubbery ethylene copolymer for use in the compositions of the present invention are copolymers derived from ethylene/n-butyl acrylate/glycidyl methacrylate and ethylene/glycidyl methacrylate.

A particularly preferred rubbery ethylene copolymer (b) is a copolymer of at least 55% by weight ethylene, 1–10% by weight of an unsaturated epoxide of 4–11 carbon atoms, and 0–35% by weight of at least one alkyl acrylate, alkyl methacrylate, or mixtures therof where the alkyl groups contain 1–8 carbon atoms. Preferred unsaturated epoxides are glycidyl methacrylate and glycidyl acrylate which are present in the copolymer at a level of 1–7% by weight. Preferably, ethylene content is greater than 60% by weight and the third moiety is selected from methyl acrylate, iso-butyl acrylate, and n-butyl acrylate. The alloy composition described by this invention preferably contains about 5% to about 60% by weight (b), most preferably about 15% to 30% by weight.

The non-rubbery styrene copolymers (c) of the claimed invention are preferably random copolymers containing at least one other reactive group, i.e., a second reactive group. Component (c) preferably contains at least 60% by weight of styrene, and 3–40% by weight of maleic anhydride, maleic acid, fumaric acid, acrylic acid or methacrylic acid.

Suitable preferred non-rubbery styrene copolymers (c) include styrene/acrylic acid, styrene/methacrylic acid, styrene/itaconic acid, styrene/acrylic acid/methyl methacrylate, styrene/acrylic acid/methyl acrylate, styrene/methacrylic acid/ethyl acrylate, styrene/methacrylic acid/methyl methacrylate, styrene/acrylic acid/n-butyl methacrylate, styrene/methyl acrylate/maleic anhydride, styrene/maleic anhydride, styrene/maleic acid, or styrene/fumaric acid. The most preferred styrene copolymers (c) for use in the compositions of the present invention are styrene/maleic anhydride or styrene/methyl acrylate/maleic anhydride terpolymers. The alloy composition described by this invention preferably contains about 1% to about 40% by weight of component (c), most preferably about 3% to 20% by weight.

Optionally, a styrene containing block copolymer, component (d), may be used to further enhance compatibility of components (b) and (c) with component (a). The block copolymers (d) may also contain reactive groups capable of reacting with the reactive groups on (b) and/or (c). Styrene containing block copolymers (d) that are suitable for the present invention include styrene-butadiene block copolymer (SBR), styrene-butadiene-styrene block copolymer (SBS), hydrogenated styrene-butadiene block copolymer (SEB), hydrogenated styrene-butadiene-styrene block copolymer (SEBS), styrene-isoprene block copolymer (SIR), styrene-isoprene-styrene block copolymer (SIS), hydrogenated styrene-isoprene block copolymer (SEP), hydrogenated styrene-isoprene-styrene block copolymer (SEPS), ethylene-styrene block copolymers, propylene-styrene block copolymers, ethylene-acrylate-styrene graft copolymers and ethylene-propylene-diene monomer-styrene graft copolymers. Other styrene containing block copolymers (d) that are suitable for the present invention include styrene-butadiene block copolymer (SBR), styrene-butadiene-styrene block copolymer (SBS), hydrogenated styrene-butadiene block copolymer (SEB), hydrogenated styrene-butadiene-styrene block copolymer (SEBS), styrene-isoprene block copolymer (SIR), styrene-isoprene-styrene block copolymer (SIS), hydrogenated styrene-isoprene block copolymer (SEP), hydrogenated styrene-isoprene-styrene block copolymer (SEPS), ethylene-styrene block copolymers, propylene-styrene block copolymers, ethylene-acrylate-styrene graft copolymers, and ethylene-propylene-diene monomer-styrene graft copolymers, wherein any of the preceding polymers also incorporate in the polymer structure maleic anhydride, acrylic acid, methacrylic acid, or an epoxy group by copolymerization or a grafting reaction, e.g., SBS-g-maleic anhydride, hydrogenated styrene-styrene block graft copolymer (SES)-g-maleic anhydride. One or more styrene-containing block copolymers may be used in the alloy composition. The alloy composition described by this invention preferably contains about 0% to about 30% by weight (d).

The composition of the present invention as described herein is based on 100% components (a)–(c), or (a)–(d), as appropriate. Of course, the compositions can include other ingredients as are customarily used in the conventional compounding of thermoplastics, provided that such other ingredients are no more than 100 parts by weight per 100 parts by weight of components (a)–(c) or (a)–(d). Examples of such other ingredients include carbon black, metal deactivators, glass fibers, graphite fibers, DuPont Kevlar® aramid fibers, glass spheres, plasticizers, lubricants, silica, titanium dioxide, pigments, clay, mica, and other mineral fillers, flame retardants, antioxidants, ultraviolet stabilizers, heat stabilizers, processing aids, adhesives, tackifiers, and/or other thermoplastics that aid in the processing or the high temperature dimensional stability of the alloy such as polyphenylene sulfide (PPS), polyphenylene oxide (PPO), styrene-acrylonitrile copolymers (SAN), poly(methylene butyrolactone) (MBL), polysulfone, polycarbonate (PC), polyamide (nylon 6, nylon 6,6, nylon 12), and/or polyester (PET, PBT, 3GT).

The components of the compositions described herein are preferably melt blended with each other under high shear. The components may first be combined with one another in a "salt and pepper" blend, i.e., a pellet blend of each of the ingredients, or they may be combined with one another via simultaneous or separate metering of the various components, or they may be divided and blended in one or more passes into one or more sections of mixing equipment such as an extruder, Banbury, Buss Kneader, Farrell continuous mixer, or other mixing equipment. For example, an extruder with two or more feed zones into which one or more of the ingredients may be added sequentially can be used.

High shear insures proper dispersion of all the components such as would be necessary to carry out the reaction between the reactive groups in (b) and (c), and optionally in (d). In addition, sufficient mixing is essential to achieve the morphology necessary in the compositions of the present invention. The morphology required for the compositions of the present invention is one that produces an SPS phase (a) that is continuous or co-continuous with respect to the other components.

The following Examples are intended to further illustrate various aspects of this invention and as such should not be interpreted as being unduly limiting. In presenting these examples all parts and percentages are by weight unless indicated otherwise and temperatures are in degrees Celsius.

EXAMPLES

The polymer alloys made according to this invention are manufactured by melt blending the primary components of a syndiotactic poly(styrene) resin, a rubbery ethylene copolymer containing a first reactive group, and a non-rubbery styrene copolymer containing a second reactive group along with other additives In these examples, the melt blending is accomplished using either a 30 mm twin screw extruder under the equipment conditions outlined in Table 1 or a Brabender laboratory mixer with a set-up temperature of 300° C. A twin screw extruder or Brabender laboratory mixer provides the high shear and residence time in the melt state necessary to provide the mixing required to produce an acceptable alloy. Other mixing equipment designed for use with polymer melts that can provide a similar high shear mixing would also be capable of manufacturing the alloys for this invention. This includes but is not limited to Banbury mixers, Buss co-kneaders, and two-roll-mills.

The steps for manufacturing the alloy are as follows:

1) Tumble mix a pellet blend of the various polymer components along with any additives.
2) Melt blend the mixture from step 1 using a twin screw extruder or similar device.
3) Quench the polymer strand exiting the extruder in a cold water bath and pelletize the strand after drying.

TABLE 1

| | Temperature Profile for 30 mm twin screw extruder | | | | | | | | | |
|---|---|---|---|---|---|---|---|---|---|---|
| Zone | 1 | 2 | 3 | 4 | 5 | 6 | 7 | 8 | Die | Melt |
| Temp (° C.) | 265 | 265 | 265 | 265 | 265 | 265 | 265 | 265 | 270 | 290–300 |

Extruder conditions: 250 RPM and 12 lb/hr production rate

TABLE 2

| Materials | Description |
|---|---|
| SPS | Homopolymer. Melting point of 270° C. (DSC peak) |
| Questra ®WA204 | Commercially available SPS polymer. Preblended formulation of 65 vol % SPS homopolymer, 20 vol % glass fiber, 15 vol % styrene based block copolymer. Specific commercial formulation not disclosed by manufacturer, volume percents based on DSC and TEM analysis of material. |
| EnBAGMA 5% | Ethylene (67%), n-butylacrylate (28%), and glycidyl methacrylate (5%) random copolymer. |
| EnBAGMA 9% | Ethylene (66%), n-butylacrylate (25%), and glycidyl methacrylate (9%) random copolymer. |
| Aldrich 42,694-6 | Styrene (93%) and maleic anhydride (7%) random copolymer |
| Irganox 1010 | Thermal oxidative stabilizer |

TABLE 3

SPS Homopolymer Based Alloys - Compositions given in weight percent

| | Material | | | | |
|---|---|---|---|---|---|
| | (–128A) Comparative Ex. A | (–68B) Comparative Ex. B | (–90D) Comparative Ex. C | (–90B) Ex. 1 | (–90C) Ex. 2 |
| SPS | 99.8 | 70.0 | 70.0 | 70.0 | 70.0 |
| EnBAGMA 5% | xx | 29.8 | xx | 26.3 | xx |
| EnBAGMA 9% | xx | xx | 29.8 | xx | 26.3 |

TABLE 3-continued

SPS Homopolymer Based Alloys - Compositions given in weight percent

| | Material | | | | |
|---|---|---|---|---|---|
| | (-128A) Comparative Ex. A | (-68B) Comparative Ex. B | (-90D) Comparative Ex. C | (-90B) Ex. 1 | (-90C) Ex. 2 |
| Aldrich 42,694-6 | xx | xx | xx | 3.5 | 3.5 |
| Irganox 1010 | 0.2 | 0.2 | 0.2 | 0.2 | 0.2 |
| Physical Properties | | | | | |
| Elongation at Break (%) | 2.1 | 2.1 | 2.1 | 3.0 | 3.0 |
| Tensile Strength (kpsi) | 3.0 | 2.0 | 1.8 | 2.8 | 2.9 |
| Notched Izod (ft lb/in) | 0.18 | 0.33 | 0.48 | 0.52 | 0.65 |

Glass Filled SPS Based Alloys - Compositions given in weight percent

| | Material | | | | | |
|---|---|---|---|---|---|---|
| | -109A Comp. Ex. D | -109B Comp. Ex. E | -109G Comp. Ex. F | -109C Ex. 3 | -109D Ex. 4 | -109H Ex. 5 |
| Questra ® WA204‡ | 99.8 | 70.0 | 80.0 | 70.0 | 70.0 | 80.0 |
| EnBAGMA 9% | xx | 29.8 | 19.8 | 26.3 | 21.8 | 16.3 |
| Aldrich 42,694-6 | xx | xx | xx | 3.5 | 8.0 | 3.5 |
| Irganox 1010 | 0.2 | 0.2 | 0.2 | 0.2 | 0.2 | 0.2 |
| Physical Properties | | | | | | |
| Elongation at Break (%) | 3.8 | 7.5 | 5.6 | 9.0 | 9.7 | 8.0 |
| Tensile Strength (kpsi) | 7.1 | 4.3 | 5.4 | 3.9 | 4.4 | 5.1 |
| Notched Izod (ft lb/in) | 1.4 | 1.7 | 1.8 | 1.7 | 1.6 | 1.9 |
| Flexural Modulus (kpsi) | 490 | 370 | 460 | 380 | 420 | 480 |

‡Questra ® WA204 is a commercial product of the Dow Chemical Company that has glass fiber and styrene based block copolymer blended with a syndiotactic polystyrene-based polymer. This pre-blended material was used as received.

Table 2 provides information regarding the materials used in the examples that further describe this invention. Table 3 presents the compositions and resulting physical properties for these alloys. Samples of series -68 and -90 were compounded in a Brabender mixer and compression molded in ⅛ inch thick plaques. While, the -109 series and -128A samples were compounded in a 30 mm twin screw extruder and injection molded (45° C. mold temperature) into ⅛ inch thick flex bars and plaques. Microtensile bars were die cut from the molded plaques and tested according to ASTM D1708 using a crosshead speed of 0.2 in/min. Notched izod impact strengths were tested according to ASTM D256. And the flexural modulus of the -109 series was tested on the molded flex bars according to ASTM D790.

As shown in Table 3, Comparative Examples A–C and Examples 1 and 2 are all based on SPS homopolymer. The neat SPS resin (Comparative Example A) compounded on the twin screw extruder with 0.2 wt % Irganox 1010 produces a sample with a measured elongation at break of 2.1%. By incorporating a rubbery ethylene copolymer that includes a polar group as in Comparative Examples B and C, the measured elongation at break is not significantly different from the neat SPS of Comparative Example A. However, by incorporating a styrene-maleic anhydride copolymer along with the rubbery ethylene copolymer as in Examples 1 and 2, the measured elongation at break is increased to 3.0%, an increase of 43% relative to Comparative Examples A–C. Also, the present invention as demonstrated by Examples 1 and 2 provides for an increase of 30 to 50% in the notched izod impact strength relative to Comparative Examples B and C.

Comparative Examples D–F and Examples 3 to 5 are all based on the pre-blended mixture of a SPS based polymer, glass fibers, and a styrene based block copolymer sold commercially by Dow Chemical as Questra® WA204. The elongation at break data outlined in Table 3 shows that extensibility of the alloys can be improved by incorporating a rubbery ethylene copolymer containing a polar group as taught in the art (U.S. Pat. No. 5,543,462) and demonstrated in Comparative Examples E and F. The mechanical properties of these two, samples show that elongation at break is increased relative to Comparative Example D. However, Examples 3, 4 and 5 demonstrate that the novel addition of a non-rubbery styrene-maleic anhydride copolymer to the system further enhances ductility and extensibility by increasing elongation at break 30 to 40% relative to the Comparative Examples E and F.

An important result of this novel modification package is that the ductility improvement that is provided to SPS based alloys can now be achieved with less of a detrimental effect on other tensile and flexural properties. As seen in the Table 3 data, although Comparative Example E produces an alloy with an elongation at break of 7.5% which is near the 8.0% measured for Example 5, it is achieved by using 10 wt % more of the modifying package. Because more of this less efficient modifier is needed in Comparative Example E, the tensile strength and flexural modulus retained relative to the unmodified Comparative Example D are only 60% and 76%, respectively. Conversely, the more efficient modification package demonstrated by Example 5 produces an 8.0% elongation at break while retaining a tensile strength and flexural modulus relative to Comparative Example D of 72% and 98%, respectively.

Having thus described and exemplified the invention with a certain degree of particularity, it should be appreciated that the following claims are not to be so limited but are to be afforded a scope commensurate with the wording of each element of the claim and equivalents thereof.

I claim:

1. A polymer composition comprising a melt blend of
   (a) 10 to 94 wt. % syndiotactic polystyrene polymer;
   (b) 5 to 60 wt. % rubbery ethylene copolymer comprising a first reactive group; and
   (c) 1 to 40 wt. % non-rubbery random styrene copolymer comprising a second reactive group,
   wherein the first reactive group and the second reactive group are reactive with each other and the total of the weight % of components (a), (b) and (c) is 100%.

2. The composition of claim 1 additionally comprising
   (d) 1 to 50 wt. % styrene-containing block copolymer, optionally comprising a reactive group,
   wherein the total of the weight % of components (a), (b), (c) and (d) is 100%.

3. The composition of claim 2 wherein component (d), containing a reactive group, selected from the group consisting of:
   SBS-g-maleic anhydride, and
   SES-g-maleic anhydride.

4. The composition of claim 1 or 2 wherein component (a) comprises comonomers.

5. The composition of claim 1 wherein component (b) is a terpolymer of formula ethylene/X/Y, wherein X is an acrylate and Y is a glycidyl acrylate or glycidyl methacrylate.

6. The composition of claim 5 wherein component (b) is ethylene/n-butyl acrylate/glycidyl methacrylate.

7. The composition of claim 2 wherein component (b) is a terpolymer of formula ethylene/X/Y, wherein X is an acrylate and Y is a glycidyl acrylate or glycidyl methacrylate.

8. The composition of claim 7 wherein component (b) is ethylene/n-butyl acrylate/glycidyl methacrylate.

9. The composition of claim 1 wherein component (c) is styrene/maleic anhydride.

10. The composition of claim 2 wherein component (c) is styrene/maleic anhydride.

11. The composition of claim 1 wherein component (c) is styrene/methyl acrylate/maleic anhydride.

12. The composition of claim 2 wherein component (c) is styrene/methyl acrylate/maleic anhydride.

13. The composition of claim 1 or 2 additionally comprising filler.

14. A shaped article comprising the composition of claim 1 or 2.

15. A film comprising the composition of claim 1 or 2.

16. A coating for wire and cable comprising the composition of claim 1 or 2.

17. A polymer composition comprising a melt blend of
   (d) about 50 to 85 wt. % syndiotactic polystyrene polymer;
   (e) about 15 to 30 wt. % rubbery ethylene copolymer comprising a first reactive group; and
   (f) about 3 to 20 wt. % styrene copolymer comprising a second reactive group,
   wherein the first reactive group and the second reactive group are reactive with each other and the total of the weight % of components (a), (b) and (c) is 100%.

* * * * *